(12) United States Patent
Knopf (10) Patent No.: US 9,121,730 B2
(45) Date of Patent: Sep. 1, 2015

(54) POSITION MEASURING SYSTEM (71) Applicant: Robert Bosch GmbH, Stuttgart (DE)

(72) Inventor: Jochen Knopf, Donnersdorf (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 14/060,397

(22) Filed: Oct. 22, 2013

(65) Prior Publication Data

US 2014/0115911 A1 May 1, 2014

(30) Foreign Application Priority Data

Oct. 26, 2012 (DE) .......................... 10 2012 219 607

(51) Int. Cl.
*G01D 5/347* (2006.01)
*G01D 5/244* (2006.01)
*G01D 5/245* (2006.01)

(52) U.S. Cl.
CPC .......... *G01D 5/24476* (2013.01); *G01D 5/2454* (2013.01); *G01D 5/34746* (2013.01); *G01D 5/34776* (2013.01)

(58) Field of Classification Search
CPC .......... G01D 5/24476; G01D 5/34746; G01D 5/34776
USPC .......................................................... 33/706
See application file for complete search history.

(56) References Cited

U.S. PATENT DOCUMENTS

| 4,009,377 | A | | 2/1977 | Elms |
| 4,701,615 | A | * | 10/1987 | Schmitt ..................... 250/237 G |
| 4,786,891 | A | * | 11/1988 | Ueda et al. ..................... 341/13 |
| 4,791,653 | A | * | 12/1988 | McFarland et al. ........... 375/367 |
| 5,434,602 | A | * | 7/1995 | Kaburagi et al. ......... 346/139 R |
| 5,761,216 | A | * | 6/1998 | Sotome et al. ................. 714/738 |
| 6,414,957 | B1 | * | 7/2002 | Kang et al. ................. 370/395.1 |
| 7,013,575 | B2 | * | 3/2006 | Strasser et al. .................. 33/706 |
| 7,026,604 | B2 | * | 4/2006 | Keong ..................... 250/231.13 |
| 7,726,038 | B2 | * | 6/2010 | Reusing ......................... 33/706 |
| 2011/0316527 | A1 | | 12/2011 | Dolsak et al. |
| 2012/0026321 | A1 | | 2/2012 | Hasler et al. |
| 2012/0265484 | A1 | * | 10/2012 | Nagura ......................... 702/150 |
| 2014/0299755 | A1 | * | 10/2014 | Lee .......................... 250/231.18 |

FOREIGN PATENT DOCUMENTS

| DE | 10 2007 042 796 A1 | 3/2009 |
| DE | 10 2011 106 940 A1 | 2/2012 |
| EP | 0 789 226 A1 | 8/1997 |
| JP | 2007-163313 A | 6/2007 |
| WO | 2010/112082 A1 | 10/2010 |

* cited by examiner

*Primary Examiner* — Christopher Fulton
(74) *Attorney, Agent, or Firm* — Maginot Moore & Beck LLP (57) ABSTRACT

A position measuring system includes a first portion and a second portion, which can be moved relative to the first portion. The first portion has a material measure having a multiplicity of markings that are each able to assume two different values. A number m of directly successive markings codes a respective explicit absolute position along the material measure, and a number m−1 of directly successive markings does not code an explicit absolute position. The second portion has a scanning device having a number k of individual sensors for scanning a number n of directly successive markings. The scanning device is functionally connected to an evaluation device in order to ascertain the position of the second portion relative to the first portion. The condition n>m is satisfied, and the evaluation device is configured to recognize a scanning error in the scanning device.

11 Claims, 3 Drawing Sheets

POSITION MEASURING SYSTEM

This application claims priority under 35 U.S.C. §119 to patent application no. DE 10 2012 219 607.2, filed on Oct. 26, 2012 in Germany, the disclosure of which is incorporated herein by reference in its entirety.

BACKGROUND

The present disclosure relates to a position measuring system and to a linear guide.

There are numerous applications known from practice in which it may be desirable to determine an absolute position for a first component that moves relative to a second component. Examples of such an application may be linear systems and linear guides, in particular, which can be used for various applications in handling engineering, particularly in linear engineering. To that end, there are numerous linear engineering opportunities for use as a machine component in machine construction, particularly in production or automation engineering.

By way of example, DE 10 2007 042 796 A1 reveals a linear guide with a guide carriage that can be moved along said linear guide. The linear guide described therein has an absolute material measure for determining an absolute position for the guide carriage in relation to the linear guide or to the material measure fitted thereto.

U.S. Pat. No. 4,009,377 A describes a method that allows determination of an absolute position for a guide carriage along a linear guide. To that end, for each distinguishable absolute position of the guide carriage, a respective pseudo random binary signal sequence (PRBS), which is also known and familiar by the term pseudo random binary sequence (PRBS), is produced by means of a shift register and put onto a material measure arranged along the linear guide. A sensor that can move relative to the material measure can scan a plurality of bits of the pseudo random binary signal sequence (PRBS) that are arranged next to each other. In order to determine the absolute position of the sensor and hence the absolute position of the guide carriage along the material measure, a shift register is filled with a bit sequence that corresponds to a zero position for the material measure. Next, the shift register is advanced as often as it takes for its content to match the measured value from the sensor. The recorded number of advances is a measure of the absolute position relative to the material measure.

A drawback of this is that numerous disturbing influences can result in an error in the scanning of the material measure or in the determination of the correct absolute position. This can cause corruption of the scan result or erroneous absolute position finding. Examples of these disturbing influences that cause errors are noise or unwanted electrical or electromagnetic effects, which can cause a bit error. As a result of this erroneous scanning or erroneous position finding, a workpiece can be rejected, for example, if production tolerances are exceeded on account of the erroneous position finding and resultant incorrect control of the guide carriage. Particularly also in safety-critical applications for a linear guide, it is desirable to achieve a high level of reliability for the absolute position finding for a guide carriage along a linear guide.

The object of the disclosure is therefore to provide a position measuring system that allows reliable absolute position finding.

This object is achieved by a position measuring system and a linear guide as described herein. Advantageous developments of the disclosure are specified in the subclaims.

SUMMARY

A position measuring system according to the disclosure has a first portion and a second portion, which can be moved relative to the first portion. The first portion has a material measure having a multiplicity of markings arranged in a row that are each able to assume two different values. A number m of directly successive markings within a marking row codes an explicit absolute position along the material measure and a number m−1 of directly successive markings does not code an explicit absolute position. The second portion has a scanning device having a number k of individual sensors for scanning a number n of directly successive markings, wherein the scanning device is functionally connected to an evaluation device in order to ascertain the position of the second portion relative to the first portion. With the separation distance $\lambda$ of the material measure and the separation distance $\delta$ of the individual sensors, the following relationship applies: $\delta = \lambda \times n \div k$.

According to the disclosure, the condition n>m is satisfied, and in this case a scanning error in the scanning device can be recognized by means of the evaluation device.

By way of example, the first portion may be a linear guide and the second portion may be a guide carriage moving along the linear guide. In this case, the material measure may be arranged along the linear guide. Furthermore, the rows of markings may be provided in the form of bit sequences. For example, it is possible for the evaluation device to be in the form of a microprocessor and a memory or alternatively in the form of an integrated circuit in the form of what is known as a field programmable gate array (FPGA).

Hence, the position measuring system according to the disclosure makes it possible in a particularly simple, efficient and reliable manner to recognize an error that can occur during the scanning, for example, as a result of numerous disturbing influences. In this case, the multiplicity of markings on the material measure can be chosen such that the number of markings that needs to be scanned for error recognition is as small as possible. As a result, it is not absolutely necessary to significantly increase the physical size of the absolutely coded material measure and/or the scanning device in comparison with previously known designs. Accordingly, a single track that comprises all of the information required for position finding and error recognition may suffice on the material measure.

In this case, the markings to be scanned for position finding can be put on or made in the material measure mechanically, optically or magnetically. By way of example, the markings can also be impressed into the material measure in the form of hole patterns, the influence of which on the inductivity of a coil sensor can be used for scanning said material measure.

The error recognition can take place particularly reliably and efficiently if the rows of markings are each produced in the form of a single, common pseudo random binary signal sequence (PRBS), which is also known and familiar as what is known as a pseudo random binary sequence (PRBS). This sequence has the advantageous property that only a single bit of the code describing the position, rather than the whole code, needs to be accommodated on the length of a distinguishable position. This allows a large volume of information despite little redundancy. It is also possible to generate a pseudo random binary signal sequence (PRBS) that has the advantageous property that, besides the code for position, a fraction of the directly adjacent positions is also included. The recording and evaluation of both pieces of information allows 1-bit error recognition. In such a case of error, it is also possible to determine the bit that has been erroneously scanned or recorded.

In one particularly advantageous embodiment of the disclosure, the condition $2^{(n-m)} > n$ is satisfied, wherein the evaluation device can correct a reading error in at least one of the individual sensors. Hence, errors, for example when using a linear guide for which the absolute position finding is effected using the position measuring system according to the disclosure, can actually be corrected before they have an adverse effect. By way of example, it is conceivable that in cases in which a linear guide is used in production engineering, the workpiece rejects are reduced by avoiding incorrect positions of the guide carriage. Even in the case of safety-oriented systems, the inventive error recognition with error correction can mean an increase in safety or quality.

In a further advantageous embodiment of the disclosure, the condition $2^{(n-m-1)} < n$ is satisfied. In that case, the evaluation device can correct a scanning error in a single individual sensor. Hence, it is possible to reduce the number of individual sensors required to the smallest possible number.

By way of example, for error correction in a pseudo random binary signal sequence (PRBS) as described above, it is possible for an error correction method to be implemented based on what is known as a Hamming code. The Hamming code is based on the idea of using a particular set of parity bits for a code word of fixed length that is to be protected and calculating said parity bits in different ways. In this case, a scanning error becomes evident from the fact that some parity bits are incorrect while other parity bits are correct. The distinction as to whether a parity bit is incorrect or correct is determined by the match between the scanned parity bits and the parity bits calculated following the transmission from the bits of the bit sequence to be protected. Hence, any combination of incorrect and correct parity bits can be explicitly attributed to a particular bit in the overall scanned bit sequence, including the parity bits themselves. This allows errors to be corrected. According to the disclosure, error correction based on the Hamming code can be achieved by virtue of the feedback bit sequence, that is to say the feedback sequence, itself being a pseudo random binary signal sequence (PRBS). In this case, the length of the states of this pseudo random binary signal sequence (PRBS) may be the same as the number of parity bits used.

In one particularly advantageous embodiment of the disclosure, the evaluation device produces and/or keeps a first table of values with a multiplicity of rows, wherein each row contains a piece of position information and a piece of error information. With the aid of the table of values, the evaluation device can be used to check whether an absolute position scanned on the material measure corresponds to a theoretically possible setpoint absolute position, that is to say a piece of position information in a particular row of the first table of values. In this case, by way of example, the table of values may be configured such that the error information pertaining to an absolute position shown in a row of the table of values adopts three states, namely "no error", "correctable error" or "uncorrectable error". For a table row that is denoted as "uncorrectable error", the position information may be a dummy value.

It has been found to be advantageous if the evaluation device is set up to carry out a method having the following steps:
  selection of a particular row in the first table of values using samples from all of the individual sensors of the scanning device,
  output of a position value and/or of an error signal from the particular row.

In other words, the first table of values is addressed with the measured values of the individual markings on the material measure. Hence, it is possible to ascertain a particular row within the first table of values and to read and output a corresponding position value and/or an error signal from the particular row.

It is advantageous if the first table of values can be produced according to a method having the following steps:
  a) marking of all of the rows in the first table of values with the error information "uncorrectable error",
  b) entry of an explicit absolute position as position information for each position that the second portion can adopt relative to the first portion, wherein the relevant row is marked with the error information "no error",
  c) inversion of the measured value for each marking of the material measure for each position of the second portion relative to the first portion, wherein the relevant row in the first table of values is marked with the error information "correctable error" following the inversion.

p check bits can be used to code various $2^p$ states. Hence, no more than $n=2^p-p-1$ measurement bits ought to be present so that a 1-bit error correction is possible. In order to find out, for a prescribed generator function, whether the 1-bit error correction is possible and in order to actually perform said correction, an exemplary table of values can be designed as follows.

The table of values is addressed using all the sensor bits and indicates a position value and an error state in each row. The error state can assume the following values, namely as described above, "no error", "correctable error" or "uncorrectable error".

In the initial state, all the rows in the table of values are denoted by "uncorrectable error". The associated position value is then entered in all the rows that correspond to an admissible bit sequence of the pseudo random binary signal sequence (PRBS) of the material measure, the row being marked with "no error".

Next, the relevant bit position can be inverted for all the bit positions from all the admissible bit sequences. It is then possible to check whether the relevant row in the table of values is denoted by "uncorrectable error". If this is the case, the position value from the relevant admissible bit sequence can be entered, the row being denoted by "correctable error". If it is not the case, the available generator function is not suitable for a 1-bit error correction. The generator function is suitable for the 1-bit error correction when all the above tests have a positive outcome.

A computer can be used to test all the generator functions. When m measurement bits are present, the above test needs to be performed $(2^m-1)$ times in order to find all the admissible generator functions. In order to perform the actual absolute position measurement, the table of values can be addressed using all the sensor bits, and the position value and the error state can then be read.

In an alternative, advantageous embodiment of the disclosure, the evaluation device produces and/or keeps a second table of values and a third table of values, wherein the second table of values has a multiplicity of rows and each row contains a piece of position information and an auxiliary value as error information. The auxiliary value or the error information may be an arithmetic continuation of a row, for example, that is to say an arithmetic continuation of the respective marking row. The third table of values may contain a correction value and/or an error state.

In this alternative embodiment, two separate tables of values are thus used. The splitting of error recognition information and error correction information over two tables of values affords the advantage that the extent of both the second table of values and the third table of values is reduced in comparison with a single table of values that contains all of the information.

It is advantageous if the evaluation device is set up to carry out a method having the following steps:
 a) selection of a particular row in the second table of values using the measured values for a number m of markings on the material measure,
 b) selection of a particular row in the third table of values using an XOR function for the measured values of the remaining (n-m) markings with an auxiliary value obtained from the particular row in the second table of values,
 c) correction of the measured values in step a) by means of a correction value that is taken from the particular row in the third table of values from step b),
 d) selection of a particular row in the second table of values using the measured values corrected under step c), and output of the relevant position information in this particular row.

In other words, the second table of values is addressed with a bit sequence element from a number m from the number n of measured values for the markings on the material measure. In this case, the particular row may indicate how a bit sequence of the material measure ought to continue on the basis of the bit sequence element of the scanned position finding coding, wherein the number of bits in this arithmetic error recognition coding corresponds to the number of bits in the scanned error recognition coding. In addition, it is possible for an XOR function to be performed between the arithmetic error recognition coding and the scanned error recognition coding. Should the result of the XOR function be zero in this case, it could be concluded that there is no error in the scanning of the material measure. Should the result of the XOR function differ from zero, the result of this calculation would contain a piece of information about the bit position of the error.

In addition, the third table of values could be addressed with the result of the aforementioned XOR function. In this case, the second table of values could contain a correction value and an associated error status. It is worth noting here that the correction value has a value 1 exclusively at the bit position of the scanned error recognition coding at which the 1-bit error is present. The error status could be "no error", "correctable error" or "uncorrectable error", for example. It is also worth noting that the second table of values is addressed with the aforementioned XOR function comprising the scanned error recognition coding and the correction value.

Advantageously, the multiplicity of markings on the material measure can be produced by means of a feedback shift register that has a number m of flipflops. In this case, at least one XOR or XNOR function between an output flipflop and at least one further flipflop of the shift register may be fed back to an input flip-flop.

In other words, the pseudo random binary signal sequence (PRBS) that can be used for the disclosure can be produced using a feedback shift register, which is also known and familiar by the term linear feedback shift register. Such a feedback shift register may have a particular—but arbitrarily variable, depending on the area of use—number of registers, for example, in the form of D-flipflops. Common values for the number of registers are 4, 8, 16 or 32, for example. However, any number of registers is also possible, namely 7, 9, 13, 15 or 21, for example.

Between particular flipflops, there may be branches to further flipflops that represent the feedback loops of the shift register. In this case, the number and position of these branches are definable. The specific selection of these branches is also called a generator function within the context of this application.

For example, it is possible to configure a shift register that can be used to produce a pseudo random binary signal sequence (PRBS) that uses the insight that respective XOR functions are used both for calculating a pseudo random binary signal sequence and for calculating a parity bit that is known for use in error recognition. From this statement it is possible to conclude that, on the basis of an arbitrary sub-sequence or bit sequence element of a pseudo random binary signal sequence (PRBS), any other bit of the pseudo random binary signal sequence (PRBS) produced from this bit sequence element can be regarded as a parity bit of the bit sequence element under consideration.

On the basis of this conclusion, the bit sequence element under consideration in the pseudo random binary signal sequence (PRBS) can be extended by the parity bits calculated from this bit sequence element, as a result of which every bit of the bit sequence element is protected by a parity calculation. If a 1-bit error occurs during the scanning of this coding, it can be recognized. Such a pseudo random binary signal sequence (PRBS) can thus be used to implement 1-bit error recognition in a particularly simple manner. In this case, the parity bits each directly adjoin the scanned bit sequence element of the pseudo random binary signal sequence (PRBS), as a result of which no unused bits are arranged inbetween. In this way, the disclosure allows the use of a sensor of relatively small physical size that is used as a scanning device.

To illustrate this idea according to the disclosure for 1-bit error recognition when scanning a pseudo random binary signal sequence (PRBS), it is possible to use the illustration below, which is simplified by way of example.

| | | | | Bit sequence | | | | |
|---|---|---|---|---|---|---|---|---|
| 0 | 0 | 1 | 1 | 1 | 0 | 1 | 0 | 0 |
| | | | | [Index] | | | | |
| [8] | [7] | [6] | [5] | [4] | [3] | [2] | [1] | [0] |
| [Clock pulse 0] | | | | | | |b0| | b1 | b2| |
| [Clock pulse 1] | | | | | | |b0| | b1 | b2| | |
| [Clock pulse 2] | | | | | |b0| | b1 | b2| | | |
| [Clock pulse 3] | | | | |b0| | b1 | b2| | | | |
| [Clock pulse 4] | | | |b0| | b1 | b2| | | | | |
| [Clock pulse 5] | | |b0| | b1 | b2| | | | | | |
| [Clock pulse 6] | |b0| | b1 | b2| | | | | | | |

The bit sequence shown (001110100) is a pseudo random binary signal sequence (PRBS) produced by means of a particular feedback shift register. From this, it is evident that such a pseudo random binary signal sequence (PRBS) can easily, as shown above, be presented in one dimension. In this example, each sub-sequence or each bit sequence element b0, b1 and b2 comprising three bits denotes an explicit position within the whole sequence or the whole bit sequence. A property that is advantageous for practical application is that although such explicit positions are represented by a plurality of bits, they are only a "bit width" apart from one another. Advantageously, this sequence can be converted directly into a one-dimensional material measure in which the resolution of the position corresponds precisely to a bit width.

The error recognition according to the disclosure can easily be illustrated on the basis of this exemplary bit sequence (001110100). Assuming that the sub-sequence or bit sequence element to be measured were the three bits at the index positions [5], [4], and [3], then the bit at the index position [6] is an XOR function, that is to say a parity bit, for the bits [4] and [3]. The bit at the index position [7] in this bit sequence is the parity bit for the bits [5] and [4]. In order to ensure that a 1-bit error has not occurred during the scanning of bits [5], [4] and [3], it is additionally possible to scan the bits and the index positions [7] and [6] and to check the parity relationship thereof. Although it is conceivable in this case for errors likewise to occur during the scanning of these additional bits, a 1-bit error can be recognized reliably in this case too.

The number of bits that need to be scanned and/or checked in addition to the sub-sequence or the bit sequence element in this case is dependent on the feedback combination, that is to say the number and position of feedback loops, of the feedback shift register producing the pseudo random binary signal sequence (PRBS). Within a particular pseudo random binary signal sequence (PRBS), this number is identical for all possible sub-sequences or bit sequence elements, however.

In order to minimize the number of required additional bits in this case, the feedback combination can be optimized. For the parity calculation, just a single additional bit would suffice. However, it would be a prerequisite for this that all feedback loops from the producing shift register be used in the calculation. However, this would produce only pseudo random binary signal sequences (PRBS) that are too short for practical application on the material measure. For an application with precisely two parity bits, the feedback combination needs to contain at least every second register of the producing shift register.

This can be generalized as follows: let R be the number of registers and T be the feedback combination of the feedback shift register: the PRBS generated thereby contains a certain quantity of explicit states that are each represented by R bits. Furthermore, let M be the maximum number of directly adjacent registers of the feedback shift register that are not used in the feedback calculation that occurs in T. In that case, in order to scan a state and in so doing to be able to recognize 1-bit errors, it would be necessary to scan R+M+1 bits. This approach minimizes the number of parity bits required. In other words, the number of parity bits required is equal to the number of bits of the feedback shift register that are not used in the feedback calculation plus 1.

In one particularly advantageous development of the method according to the disclosure, the production of the position finding coding and/or the error recognition coding for the material measure and/or the production of the check coding is/are carried out using a particular generator function.

The position measuring system according to the disclosure can be used particularly efficiently with a linear guide. By way of example, it is thus possible to deal with absolute position finding for high-precision tasks in production engineering or safety-critical tasks.

BRIEF DESCRIPTION OF THE DRAWINGS

Exemplary embodiments of the disclosure are explained in more detail below with reference to drawings, in which.

DETAILED DESCRIPTION

In the drawings identical components are provided with the same reference symbols throughout the figures.

Figure 1:
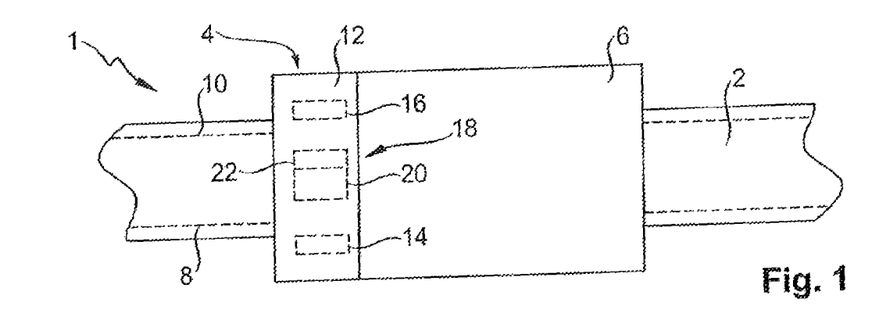
FIG. 1 shows a schematic plan view of a linear bearing with a linear guide and a guide carriage that can be moved along the latter.

FIG. 1 shows an exemplary embodiment of a linear bearing 1 in a schematic plan view. There are numerous areas of application for a linear bearing of this kind, for example as a machine element in production engineering or automation engineering.

The linear bearing 1 has a linear guide 2 with an integrated position measuring system 4. In this exemplary embodiment, the linear guide 2 is in the form of a rail on which a guide carriage 6 is mounted so as to move in linear fashion. The guide carriage 6 can be driven under control in a longitudinal direction along the linear guide 2 in two opposite directions.

The position measuring system 4 of the linear guide 2 comprises two material measures 8, 10 that are arranged on two opposite sides of the linear guide 2, with an absolutely coded material measure 8 and an incremental material measure 10 being provided. The position measuring system 4 also has a measuring head 12 that is associated with the guide carriage 6 for a common linear movement along the two material measures 8, 10. The guide carriage 6 has a first scanning device 14 with a number k of individual sensors 15 for scanning the absolutely coded material measure 8 and a second scanning device 16 in the form of a sensor for scanning the incremental material measure 6. The measuring head 12 also comprises an evaluation device 18 in the form of a microprocessor 20 and a memory 22.

Figure 2:
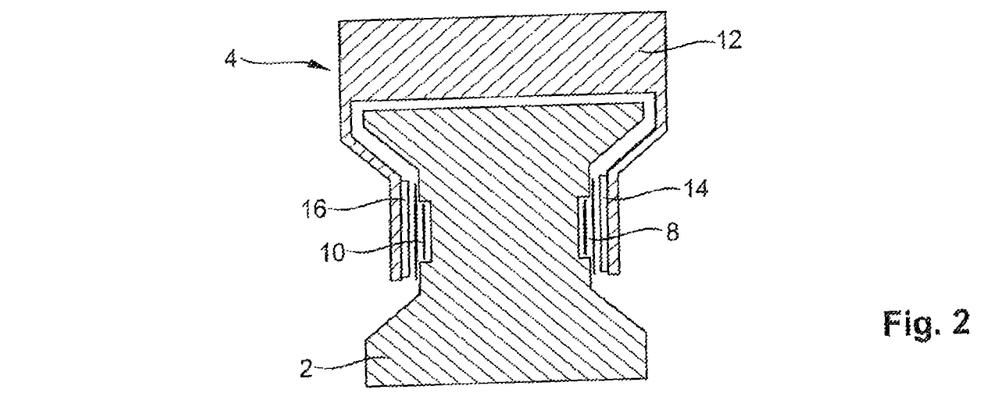
FIG. 2 shows a plan view of a linear guide with a guide carriage in cross section.

FIG. 2, which is a plan view of a linear guide 2 with a guide carriage 6—mounted thereon so as to move in linear fashion—in cross section, clearly shows that both the absolutely coded material measure 8 and the incremental material measure 10 are incorporated in the linear guide 2.

The position measuring system 4 first of all determines the absolute position one time only when it is started up, with subsequently only incremental measurement or position finding then being carried out. However, it is also possible to stipulate for the position measuring system 4, particularly in safety-critical systems, that further absolute position finding operations also take place in the course of operation. For these further finding operations for the absolute position, it is possible to stipulate that they take place periodically at an applicable interval or else for applicable events that occur within the position measuring system 4 or the linear bearing 1.

In this exemplary embodiment, the absolutely coded material measure 8 is in the form of a metal rail into which binary information, that is to say respectively determined bit sequences, has been impressed in the form of hole patterns. Hence, every distinguishable position along the absolutely coded material measure 8 has an associated particular, explicit binary coding. The first scanning device 14 for scanning the material measure 8 that has been absolutely coded in this manner or the number n of individual sensors 15 therein is in the form of a coil sensor, the inductance of which is influenced by means of the influence by the holes impressed in the material measure 8. In this way, it is possible to scan the material measure 8 reliably and largely without wear using the first scanning device 14 and determine a particular position in the material measure 8 therefrom. This inductive scanning method is largely insensitive to soiling or contamination on the absolutely coded material measure 8.

Figure 3:
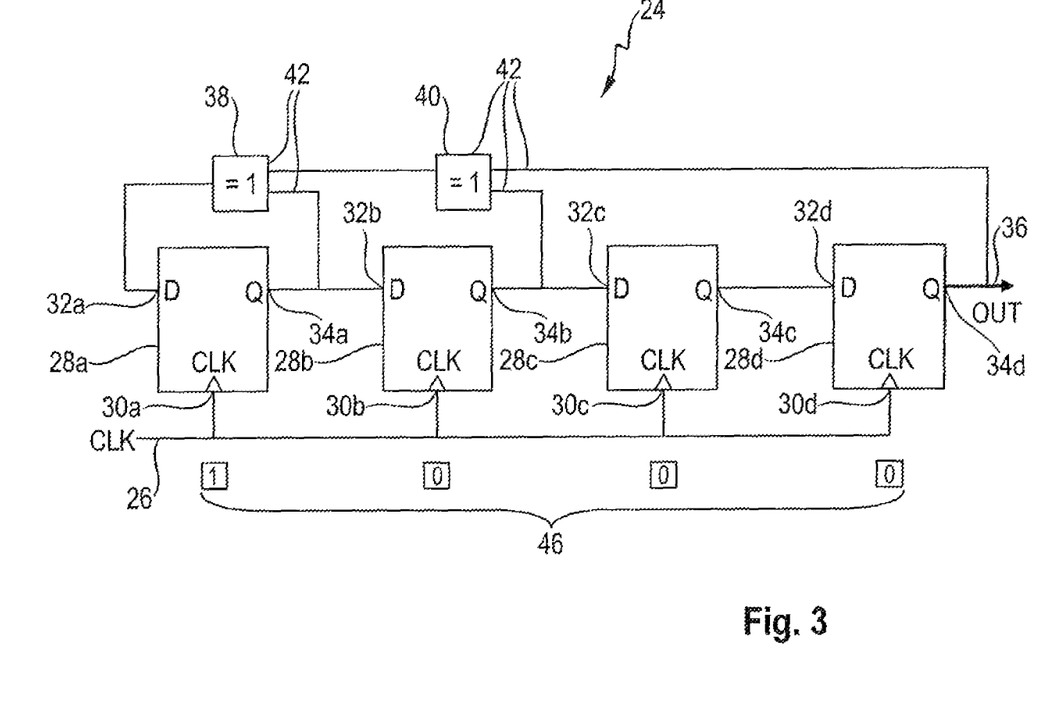
FIG. 3 shows an exemplary embodiment of a shift register for producing a pseudo random binary signal sequence (PRBS) suitable for coding a material measure.

With reference to FIG. 3, which shows a feedback shift register 24 for producing a pseudo random binary signal sequence (PRBS) that is suitable for coding the material measure 8, the text below describes the production of a pseudo random binary signal sequence (PRBS) suitable for the present disclosure. The shift register 24 shown in FIG. 3 has m stages or registers, m being a number of measurement bits. The number of states that can be produced with this register corresponds to $2^m-1$.

In addition, the shift register 24 comprises a clockable input 26 that is connected to a number m of flipflops 28a to 28m. In this exemplary embodiment, precisely four measurement bits are provided (m=4), that is to say that there are precisely four flipflops 28a to 28d present. Each of the flipflops 28a to 28d has a clock input (CLK) 30a to 30d, a data input 32a to 32d and a data output 34a to 34d.

The shift register 24 also has an output 36 at which the pseudo random binary signal sequence (PRBS) produced with the shift register 24 is output. For feedback the feedback shift register 24 also has a stipulatable or variable number of XOR or XNOR gates, this exemplary embodiment having provision for a first XOR gate 38 and a second XOR gate 40. The XOR gates 38, 40 can be understood as a type of switch that may be either open (corresponds to the value "0") or closed (corresponds to the value "1"). The number of gates and the connected combination of the XOR or XNOR gates 38, 40 are referred to as a generator function 42, which produces a particular pseudo random binary signal sequence (PRBS) at the output 36 of the shift register 24. The number of adjacent bits of the shift register 24 that are not used in the feedback calculation is minimized.

The precise order and length of a pseudo random binary signal sequence (PRBS) produced at the output 36 is determined on the basis of the generator function 42, that is to say on the basis of the number m of stages of the shift register 24 and also on the basis of the combination of XOR gates 38, 40 that is used in the calculation of the shift register 24. Where possible, the XOR gates 38, 40 are connected such that the production of the first table of values (56) or of the third table of values (66) involves absolute positions being written exclusively to rows of the first (56) or third (66) table of values, which are denoted by "uncorrectable error". The shift register 24 is initially filled with a nontrivial bit sequence as a starting value, as a result of which any clocking of the shift register 24 outputs a pseudo random binary signal sequence (PRBS) produced by means of the generator function 42 at the output 36. In this exemplary embodiment, the nontrivial bit sequence of the zero position (1000) of the material measure 8 is used as a starting value.

The shift register 24 can undertake two different tasks within the position measuring system 4. A first task involves the pseudo random binary signal sequences (PRBS) that are to be put on to the absolutely coded material measure 8 being produced for every distinguishable position along the material measure 8. A second task of the shift register 24 could also involve the latter being used to determine the absolute position of the scanning device 14. For this, the shift register 24 could be filled with the bit sequence of the zero position of the material measure 8 and clocked via the input 26 as often as it takes for the bit sequence produced at the output 36 of the shift register 24 to match the sample in the scanning device 14. The number of clocking operations recorded would be a measure of the absolute position of the scanning device 14 relative to the material measure 8. For this second task, the evaluation device 18 would need to have a shift register 24 of this kind.

According to the disclosure, although the shift register 24 is used for producing the individual pseudo random binary signal sequence (PRBS) of the material measure 8, it is not absolutely necessary for it to be used for finding the absolute position of the scanning device 14 relative to the material measure 8. The inventive determination or checking of the absolute position of the scanning device 14 is described below.

Two different embodiments of the position measuring system 4 are proposed for the evaluation of the scanned material measure 8, which are explained below.

Figure 4:
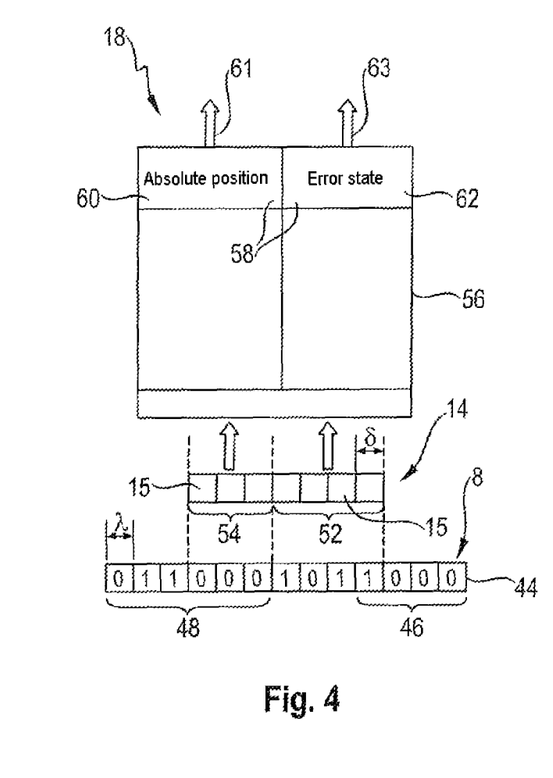
FIG. 4 shows a highly schematic view of a first exemplary embodiment of an arrangement for scanning and evaluating a material measure.

FIG. 4 shows a highly schematic view of a first exemplary embodiment of a portion of the position measuring system 4, particularly of the material measure 8, the scanning device 14 and the evaluation device 18. This illustrated portion of the position measuring system 4 can be used for scanning the material measure 8 and also for comparative evaluation with check coding as a reference value for error recognition and/or error correction.

The absolutely coded material measure 8 which is shown in FIG. 4 has a single track with a bit sequence 44 that has been produced by means of the shift register 24. In this case, the material measure is formed by an elongate metal sheet, for example, in which a multiplicity of markings arranged in a row are made that can each assume two different values. The markings may be holes in the metal strip. A hole represents the state 1, and absence of a hole represents the state 0. A marking may also have two submarkings that are chosen to be inverse with respect to one another, as a result of which the scanning certainty is improved. The markings preferably have a constant separation distance from one another. The bit sequence 44 is a pseudo random binary signal sequence (pseudo random binary sequence (PRBS)) and, in this exemplary embodiment, comprises precisely 13 bits (0110001011000). In this exemplary embodiment, a first bit sequence element 46 of the bit sequence 44 comprises precisely four bits (1000), which represent the zero position of the material measure. This corresponds to the starting value of the shift register 24. A second bit sequence 48 in the bit sequence 44 repeats precisely the number m+p−1 bits (011000) from the start of the bit sequence 44 so that markings on the material measure 8 are opposite all individual sensors 15 in all seven distinguishable absolute positions. In this case, the bit sequence 44 is chosen such that the redundancy used for error recognition and/or error correction is as low as possible and an implicit part of the pseudo random binary signal sequence (PRBS).

In order to scan the absolutely coded material measure 8, the scanning device 14 moves along the bit sequence 44 and is set up to simultaneously scan a bit sequence element having precisely n bits, n being 7 in this exemplary embodiment (n=7). This scannable bit sequence element can be divided into m measurement bits 52 and p check bits 54, m being equal to four (m=4) and p being equal to three (p=3) in this exemplary embodiment. For this, individual sensors 15 are provided which may comprise electrical coils, for example, in order to identify the presence of a hole in the material measure 8. The individual sensors 15 have a constant separation distance δ that, as shown, may be the same as the separation distance λ of the material measure 8. However, the intention may also be for the separation distance δ of the individual sensors 15 to be chosen to be shorter in accordance with DE 10 2011 106 940 A1 so that the scanning apparatus operates in ideal fashion not only in the position shown in FIG. 4 but also in somewhat shifted positions, in which the individual sensors 15 are not arranged precisely above an associated marking. In this case, k individual sensors are used for scanning n markings or bits of the material measure 8, where k>n is true. The separation distance of the individual sensors δ is then δ=λ×n÷k. The scanning signals from the individual sensors are then used in the manner known from DE 10 2011 106 940 A1 to ascertain the measured values for the individual markings on the material measure 8, which then continue to be used in accordance with the disclosure.

FIG. 4 also reveals that the evaluation device 18 comprises a first table of values 56 that can be addressed with the measured values for the individual markings on the material measure 8, namely the measurement bits 52 and the check bits 54. In each row, the first table of values 56 indicates a check coding 58 that comprises a particular absolute position value 60 and an associated error state 62. Consequently, it is not necessary to implement the shift register 24 in the evaluation device 18, since the check coding 58 that is kept and the comparison thereof with the samples from the first scanning device 14 can be used to explicitly determine the absolute position of the latter or to check the samples for a possible error.

Using the readable error state 62, it is also possible to classify the possible error. In this case, the error state 62 can assume three different values for a particular absolute position value 60, namely "no error", "correctable error" or "uncorrectable error". The addressing of the table of values 56 with the scan result from the first scanning device 14 allows a particular absolute position value 60 and the error state 62 thereof to be found and read. Comparative evaluation, that is to say comparison of the scan result from the first scanning device 14 with the absolute position value 60, therefore allows an error that can occur as a result of various disturbing influences during scanning to be recognized, and also corrected on the basis of the associated error state 62.

Should a particular absolute position value 60 have an error state 62 with the value "correctable error" or "uncorrectable error", for example, the evaluation device 18 can infer an error during the scanning of the material measure 8, since the scan result from the first scanning device 14 does not give a valid absolute position, that is to say one denoted by "no error". However, it is worth noting that such a 1-bit error may be correctable, this requiring the condition to be met that no more than $m=2^p-p-1$ measurement bits are present. Should the error state 62 of a particular absolute position value 60 be "no error", however, this absolute position would be valid, for which reason the evaluation device 18 would infer correct scanning and/or a valid absolute position. A valid absolute position is distinguished by the scanned bit sequence actually being present on the material measure 8. Following the evaluation of the scan result, the evaluation device 18 outputs a position value 61 and an error signal 63, which are used or processed further in the linear bearing 1 and/or the linear guide 2 in order to control the latter.

In this case the first table of values 56 may take the form shown below.

| Index | Address | Position | Error information |
|---|---|---|---|
| 0 | 0000000 | | Uncorrectable error |
| 1 | 0000001 | | Uncorrectable error |
| 2 | 0000010 | | Uncorrectable error |
| 3 | 0000011 | 3 | Correctable error |
| 4 | 0000100 | | Uncorrectable error |
| 5 | 0000101 | 4 | Correctable error |
| 6 | 0000110 | 2 | Correctable error |
| 7 | 0000111 | | Uncorrectable error |
| 8 | 0001000 | | Uncorrectable error |
| 9 | 0001001 | 3 | Correctable error |
| 10 | 0001010 | 3 | Correctable error |
| 11 | 0001011 | 3 | No error |
| 12 | 0001100 | 1 | Correctable error |
| 13 | 0001101 | | Uncorrectable error |
| 14 | 0001110 | | Uncorrectable error |
| 15 | 0001111 | 3 | Correctable error |
| 16 | 0010000 | | Uncorrectable error |
| 17 | 0010001 | 6 | Correctable error |
| 18 | 0010010 | 2 | Correctable error |
| 19 | 0010011 | | Uncorrectable error |
| 20 | 0010100 | 2 | Correctable error |
| 21 | 0010101 | | Uncorrectable error |
| 22 | 0010110 | 2 | No error |
| 23 | 0010111 | 2 | Correctable error |
| 24 | 0011000 | 0 | Correctable error |
| 25 | 0011001 | | Uncorrectable error |
| 26 | 0011010 | | Uncorrectable error |
| 27 | 0011011 | 3 | Correctable error |
| 28 | 0011100 | | Uncorrectable error |
| 29 | 0011101 | | Uncorrectable error |
| 30 | 0011110 | 2 | Correctable error |
| 31 | 0011111 | | Uncorrectable error |
| 32 | 0100000 | | Uncorrectable error |
| 33 | 0100001 | 6 | Correctable error |
| 34 | 0100010 | 5 | Correctable error |
| 35 | 0100011 | | Uncorrectable error |
| 36 | 0100100 | 1 | Correctable error |
| 37 | 0100101 | | Uncorrectable error |
| 38 | 0100110 | | Uncorrectable error |
| 39 | 0100111 | | Uncorrectable error |
| 40 | 0101000 | 1 | Correctable error |
| 41 | 0101001 | | Uncorrectable error |
| 42 | 0101010 | | Uncorrectable error |
| 43 | 0101011 | 3 | Correctable error |
| 44 | 0101100 | 1 | No error |
| 45 | 0101101 | 1 | Correctable error |
| 46 | 0101110 | 1 | Correctable error |
| 47 | 0101111 | | Uncorrectable error |
| 48 | 0110000 | 6 | Correctable error |
| 49 | 0110001 | 6 | No error |
| 50 | 0110010 | | Uncorrectable error |
| 51 | 0110011 | 6 | Correctable error |
| 52 | 0110100 | | Uncorrectable error |
| 53 | 0110101 | 6 | Correctable error |
| 54 | 0110110 | 2 | Correctable error |
| 55 | 0110111 | | Uncorrectable error |
| 56 | 0111000 | | Uncorrectable error |
| 57 | 0111001 | 6 | Correctable error |
| 58 | 0111010 | | Uncorrectable error |
| 59 | 0111011 | | Uncorrectable error |
| 60 | 0111100 | 1 | Correctable error |
| 61 | 0111101 | | Uncorrectable error |
| 62 | 0111110 | | Uncorrectable error |
| 63 | 0111111 | | Uncorrectable error |
| 64 | 1000000 | | Uncorrectable error |
| 65 | 1000001 | 4 | Correctable error |
| 66 | 1000010 | 5 | Correctable error |
| 67 | 1000011 | | Uncorrectable error |
| 68 | 1000100 | 4 | Correctable error |
| 69 | 1000101 | 4 | No error |
| 70 | 1000110 | | Uncorrectable error |
| 71 | 1000111 | 4 | Correctable error |
| 72 | 1001000 | 0 | Correctable error |
| 73 | 1001001 | | Uncorrectable error |
| 74 | 1001010 | | Uncorrectable error |
| 75 | 1001011 | 3 | Correctable error |
| 76 | 1001100 | | Uncorrectable error |
| 77 | 1001101 | 4 | Correctable error |
| 78 | 1001110 | | Uncorrectable error |
| 79 | 1001111 | | Uncorrectable error |

-continued

| Index | Address | Position | Error information |
|---|---|---|---|
| 80 | 1010000 | 0 | Correctable error |
| 81 | 1010001 | | Uncorrectable error |
| 82 | 1010010 | | Uncorrectable error |
| 83 | 1010011 | | Uncorrectable error |
| 84 | 1010100 | | Uncorrectable error |
| 85 | 1010101 | 4 | Correctable error |
| 86 | 1010110 | 2 | Correctable error |
| 87 | 1010111 | | Uncorrectable error |
| 88 | 1011000 | 0 | No error |
| 89 | 1011001 | 0 | Correctable error |
| 90 | 1011010 | 0 | Correctable error |
| 91 | 1011011 | | Uncorrectable error |
| 92 | 1011100 | 0 | Correctable error |
| 93 | 1011101 | | Uncorrectable error |
| 94 | 1011110 | | Uncorrectable error |
| 95 | 1011111 | | Uncorrectable error |
| 96 | 1100000 | 5 | Correctable error |
| 97 | 1100001 | | Uncorrectable error |
| 98 | 1100010 | 5 | No error |
| 99 | 1100011 | 5 | Correctable error |
| 100 | 1100100 | | Uncorrectable error |
| 101 | 1100101 | 4 | Correctable error |
| 102 | 1100110 | 5 | Correctable error |
| 103 | 1100111 | | Uncorrectable error |
| 104 | 1101000 | | Uncorrectable error |
| 105 | 1101001 | | Uncorrectable error |
| 106 | 1101010 | 5 | Correctable error |
| 107 | 1101011 | | Uncorrectable error |
| 108 | 1101100 | | Uncorrectable error |
| 109 | 1101101 | | Uncorrectable error |
| 110 | 1191119 | | Uncorrectable error |
| 111 | 1101111 | | Uncorrectable error |
| 112 | 1110000 | 1 | Correctable error |
| 113 | 1110001 | 6 | Correctable error |
| 114 | 1110010 | 5 | Correctable error |
| 115 | 1110011 | | Uncorrectable error |
| 116 | 1110100 | | Uncorrectable error |
| 117 | 1110101 | | Uncorrectable error |
| 118 | 1110110 | | Uncorrectable error |
| 119 | 1110111 | | Uncorrectable error |
| 120 | 1111000 | 0 | Correctable error |
| 121 | 1111001 | | Uncorrectable error |
| 122 | 1111010 | | Uncorrectable error |
| 123 | 1111011 | | Uncorrectable error |
| 124 | 1111100 | | Uncorrectable error |
| 125 | 1111101 | | Uncorrectable error |
| 126 | 1111110 | | Uncorrectable error |
| 127 | 1111111 | | Uncorrectable error |

Figure 5:
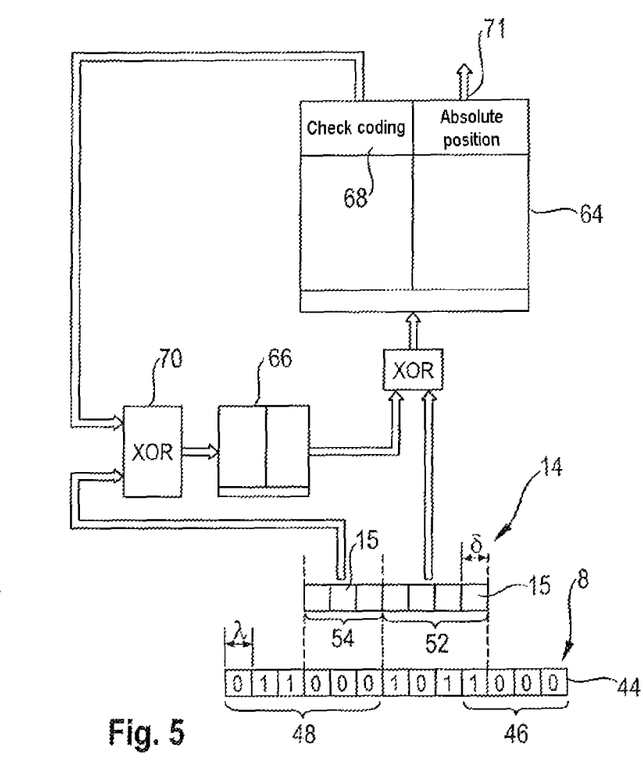
FIG. 5 shows a highly schematic view of a second exemplary embodiment of an arrangement for scanning and evaluating a material measure.

FIG. 5 shows a second exemplary embodiment of the scanning and evaluation of the material measure 8 that can be used as an alternative to the exemplary embodiment shown in FIG. 4. The production and design of the material measure 8 to be scanned, particularly of the bit sequence 44, correspond precisely to the exemplary embodiment explained above with reference to FIG. 4, however.

In the variant embodiment shown in FIG. 5, the evaluation device 18 has two separate tables of values, namely a second table of values 64 and a third table of values 66. The second table of values 64 is a table of measured values that is addressed with the measurement bits 52 from the first scanning device 14 and has a respective row containing a distinguishable absolute position value in the form of a sequence element of a pseudo random binary signal sequence (PRBS). In addition, the respective row of the table of values 64 indicates, in the form of a check coding 68, how the pseudo random binary signal sequence (PRBS) ought to be continued arithmetically. That is to say the table of measured values 64 comprises a check coding 68 with a bit sequence whose number of bits corresponds to the number of check bits 54 from the first scanning device 14.

In addition, the evaluation device 18 has a first XOR gate 70 that XORs the check coding 68—read from the second table of values 64—of a particular absolute position value with the check bits 54 from the first scanning device 14. The evaluation device 18 can then be used to check whether the result of this XOR function is zero. If the result is zero, there is no error in the scanning of the material measure 8 or in the absolute position finding. If the result is not equal to zero, the result contains a piece of information about the bit position of the error that has therefore been recognized.

The third table of values 66 is a check value table that should be addressed using the XOR function of the XOR gate 70 and that contains a correction value and an error status in one row each. That is to say the second table of values 66 is addressed using an XOR function that logically combines the check coding 68 from the second table of values 64 with the check bits 54 from the first scanning device 14. This inverts the possibly erroneous bit. For the error status indicated in the second table of values 66, three different values are possible, namely "no error", "correctable error", or "uncorrectable error".

In row zero of the second table of values 66, the correction value is zero and the associated error status corresponds to the value "no error". In the remainder of the rows of the second table of values 66, the correction value is initially denoted as "correctable error" in each case, the associated correction value containing a one exclusively at the bit position at which there is an error present. For an adequate number of check bits or parity bits, the result of the XOR function of the XOR gate 70 can also indicate errors that are uncorrectable. The error state of the relevant row is then set to "uncorrectable error". The evaluation device 18 then outputs a possibly corrected position signal 71.

The second table of values 64 and the third table of values 66 may take the form shown below.

Second table of values 64:

| Measured value | Absolute position | Arithmetic row continuation or check coding |
|---|---|---|
| 1000 | 0 | 101 |
| 1100 | 1 | 010 |
| 0110 | 2 | 001 |
| 1011 | 3 | 000 |
| 0101 | 4 | 100 |
| 0010 | 5 | 110 |
| 0001 | 6 | 011 |

Third table of values 66:

| Check value comparison | Correction value | Error status |
|---|---|---|
| 000 | 0000000 | No error |
| 001 | 0000001 | Correctable error |
| 010 | 0000010 | Correctable error |
| 101 | 0000100 | Correctable error |
| 011 | 0001000 | Correctable error |
| 111 | 0010000 | Correctable error |
| 110 | 0100000 | Correctable error |
| 100 | 1000000 | Correctable error |

On the basis of the illustrated exemplary embodiments, the disclosure can be modified in many respects. By way of example, it is conceivable for the second table of measured values 66 to be replaced by a shift register, with the check coding 68, that is to say the arithmetic continuation of the pseudo random binary signal sequence (PRBS) under consideration, being produced dynamically by means of a suitable generator function.

It is also conceivable for the evaluation device 18 not to be incorporated in the measuring head but rather to be held in a separate portion of the linear bearing 1 or the linear guide 2. Furthermore, it is conceivable for the evaluation device 18 to be in the form of an integrated circuit in the form of an FPGA.

What is disclosed is a position measuring system having a first portion and a second portion, which can be moved relative to the first portion. The first portion has a material measure having a multiplicity of markings arranged along the latter that are each able to assume two different values. A number m of directly successive markings codes a respective explicit absolute position along the material measure and a number m−1 of directly successive markings does not code an explicit absolute position. The second portion has a scanning device having a number k of individual sensors for scanning a number n of directly successive markings, wherein the scanning device is functionally connected to an evaluation device in order to ascertain the position of the second portion relative to the first portion. According to the disclosure the condition n>m is satisfied, wherein the evaluation device can be used to recognize a scanning error in the scanning device.

LIST OF REFERENCE SYMBOLS

1 Linear bearing
2 Linear guide (first portion)
4 Position measuring system
6 Guide carriage (second portion)
8 Absolutely coded material measure
10 Incremental material measure
12 Measuring head
14 First scanning device
15 Individual sensor
16 Second scanning device
18 Evaluation device
20 Microprocessor
22 Memory
24 Feedback shift register
26 Input
28a to 28d D-type flip-flop
30a to 30d Clock input
32a to 32d Data input
34a to 34d Data output
36 Output
38 First XOR gate
40 Second XOR gate
42 Generator function
44 Bit sequence of the material measure (multiplicity of markings)
46 Bit sequence element
48 Bit sequence element
52 Measurement bits
54 Check bits
56 First table of values
58 Check coding
60 Absolute position value
61 Position value
62 Error state
63 Error signal
64 Second table of values
66 Third table of values
68 Check coding
70 XOR gate
71 Position signal
m Number of markings on the material measure 8
k Number of individual sensors 15 in the first scanning device 14
λ Separation distance of the markings on the material measure
δ Separation distance between the individual sensors 15

What is claimed is:

1. A position measuring system, comprising:
a first portion including a material measure having a plurality of markings arranged in series that are each able to assume two different values, the markings of the plurality of markings having a constant separation distance λ, a respective number m of directly successive markings of the plurality of markings codes an explicit absolute position along the material measure, and a number m−1 of the directly successive markings do not code the explicit absolute position; and
a second portion configured to be moved relative to the first portion, the second portion including a scanning device having a number k of individual sensors configured to scan a number n of the directly successive markings,
wherein a separation distance δ of the individual sensors is δ=λ×n÷k,
wherein the scanning device is functionally connected to an evaluation device in order to ascertain a position of the second portion relative to the first portion,
wherein a condition n>m is satisfied, and
wherein the evaluation device is configured to recognize a scanning error in the individual sensors of the scanning device.

2. The position measuring system according to claim 1, wherein:
a condition $2^{(n-m)}>n$ is satisfied, and
the evaluation device is further configured to correct the scanning error in at least one of the individual sensors of the scanning device.

3. The position measuring system according to claim 2, wherein a condition $2^{(n-m-1)}<n$ is satisfied.

4. The position measuring system according to claim 1, wherein:
the evaluation unit is further configured to keep and/or to produce a first table of values having a first plurality of rows, and
each row of the first plurality of rows contains a piece of position information and a piece of error information.

5. The position measuring system according to claim 4, wherein the evaluation unit is further configured to carry out a first method comprising:
selecting a particular row of the first plurality of rows in the first table of values using measured values of individual markings of the material measure; and
outputting a position value and/or an error signal from the particular row.

6. The position measuring system according to claim 5, wherein the first table of values is producible according to a second method comprising:
marking all of the rows of the first plurality of rows in the first table of values with the error information "uncorrectable error";
entering an explicit absolute position as position information for each position that the second portion can adopt relative to the first portion, wherein a relevant row of the first plurality of rows is marked with the error information "no error"; and
inverting the measured values for the individual markings of the material measure of the scanning device for each position of the second portion relative to the first portion, wherein the relevant row in the first table of values is marked with the error information "correctable error" following the inversion.

7. The position measuring system according to claim 4, wherein:
the evaluation unit is configured to keep and/or to produce a second table of values and a third table of values, and
the second table of values includes a second plurality of rows and each row of the second plurality of rows contains a piece of position information and a piece of error information.

8. The position measuring system according to claim 7, wherein the evaluation unit is configured to carry out a method comprising:
selecting a first particular row of the second plurality of rows in the second table of values using a number m of measured values for the individual markings of the material measure;
selecting a second particular row of the third plurality of rows in the third table of values using an XOR function for the measured values for the remaining n-m markings with an auxiliary value obtained from the first particular row in the second table of values;
correcting samples from the selecting the first particular row using a correction value that is taken from the second particular row in the third table of values;
selecting a third particular row of the second plurality of rows in the second table of values, using the corrected samples; and
outputting relevant position information in the third particular row.

9. The position measuring system according to claim 7, wherein:
the plurality of markings of the material measure are configured to be produced by a shift register that includes a number m of flipflops, and
at least one XOR or XNOR function for an output flipflop with at least one further flipflop of the shift register is fed back to an input flip-flop.

10. The position measuring system according to claim 9, wherein a suitable selection of the at least one further flipflop is used to stipulate that, when the first table of values or the third table of values is produced, absolute positions are written exclusively to rows of the first plurality of rows of the first table of values or to rows of the third plurality of rows of the third table of values that are denoted by "uncorrectable error".

11. A linear guide comprising:
a position measuring system including
a first portion including a material measure having a plurality of markings arranged in series that are each able to assume two different values, the markings of the plurality of markings having a constant separation distance $\lambda$, a respective number m of directly successive markings of the plurality of markings codes an explicit absolute position along the material measure, and a number m−1 of the directly successive markings do not code the explicit absolute position, and
a second portion configured to be moved relative to the first portion, the second portion including a scanning device having a number k of individual sensors configured to scan a number n of the directly successive markings,
wherein a separation distance $\delta$ of the individual sensors is $\delta = \lambda \times n \div k$,
wherein the scanning device is functionally connected to an evaluation device in order to ascertain a position of the second portion relative to the first portion,
wherein a condition n>m is satisfied, and
wherein the evaluation device is configured to recognize a scanning error in the individual sensors of the scanning device.

\* \* \* \* \*